United States Patent
Mohan et al.

(10) Patent No.: US 12,007,044 B2
(45) Date of Patent: Jun. 11, 2024

(54) SUBSEA CONNECTION OF PIPELINE SECTIONS

(71) Applicants: Subsea 7 (US) LLC, Houston, TX (US); Shell International Exploration and Production Inc., Houston, TX (US); TOTAL E&P Research & Technology USA, LLC, Houston, TX (US)

(72) Inventors: Karthik Mohan, Houston, TX (US); Ilkay Darilmaz, Houston, TX (US); Khalid Mateen, Katy, TX (US); Steven Mansfield, Katy, TX (US); Florent Hurault de Ligny, Houston, TX (US)

(73) Assignees: SUBSEA 7 (US) LLC, Houston, TX (US); SHELL INTERNATIONAL EXPLORATION AND PRODUCTION INC., Houston, TX (US); TOTAL E&P RESEARCH & TECHNOLOGY USA, LLC, Houston, TX (US)

( * ) Notice: Subject to any disclaimer, the term of this patent is extended or adjusted under 35 U.S.C. 154(b) by 0 days.

(21) Appl. No.: 17/420,488

(22) PCT Filed: Jan. 2, 2020

(86) PCT No.: PCT/US2020/012096
§ 371 (c)(1),
(2) Date: Jul. 2, 2021

(87) PCT Pub. No.: WO2020/142637
PCT Pub. Date: Jul. 9, 2020

(65) Prior Publication Data
US 2022/0082183 A1 Mar. 17, 2022

(30) Foreign Application Priority Data
Jan. 3, 2019 (GB) .................................... 1900076

(51) Int. Cl.
*F16L 1/16* (2006.01)
*F16L 1/20* (2006.01)
*F16L 1/26* (2006.01)

(52) U.S. Cl.
CPC ............... *F16L 1/165* (2013.01); *F16L 1/161* (2013.01); *F16L 1/20* (2013.01)

(58) Field of Classification Search
CPC ... F16L 1/16; F16L 1/161; F16L 1/165; F16L 1/20; F16L 1/26
See application file for complete search history.

(56) References Cited

U.S. PATENT DOCUMENTS 4,028,903 A 6/1977 Dietrich
4,051,688 A * 10/1977 Ells .......................... F16L 1/26
285/24

(Continued)

FOREIGN PATENT DOCUMENTS

EP 1 956 184 8/2008
EP 2 722 571 4/2014

(Continued)

*Primary Examiner* — Benjamin F Fiorello
*Assistant Examiner* — Stacy N Lawson
(74) *Attorney, Agent, or Firm* — MATTINGLY & MALUR, PC

(57) ABSTRACT

A method of assembling a pipeline at a seabed location comprises landing a connection tool on the seabed over a free end portion of a first pipeline section already placed on the seabed. The connection tool is locked to the free end portion of the first pipeline section, a lower end of a second pipeline section is connected to the connection tool via an initiation line. While applying tension to the initiation line against reaction force of the connection tool, at least a lower end portion of the second pipeline section is landed on the seabed with the lower end facing a free end of the first pipeline section. The lower end of the second pipeline (Continued)

section is then pulled into mechanical engagement with the free end of the first pipeline section.

24 Claims, 5 Drawing Sheets

(56) References Cited

U.S. PATENT DOCUMENTS

| | | | | |
|---|---|---|---|---|
| 4,133,182 | A | * | 1/1979 | Chateau ................ F16L 1/165 285/24 |
| 4,363,566 | A | | 12/1982 | Morton |
| 4,459,065 | A | | 7/1984 | Morton |
| 5,593,249 | A | * | 1/1997 | Cox ........................ E21B 41/04 405/169 |
| 6,024,514 | A | * | 2/2000 | Ostergaard ............... F16L 1/26 405/170 |
| 6,227,765 | B1 | | 5/2001 | von Trepka |
| 6,234,717 | B1 | * | 5/2001 | Corbetta ................ F16L 1/265 405/169 |
| 6,312,193 | B1 | * | 11/2001 | Witting ............... E21B 43/0135 405/169 |
| 6,997,645 | B2 | | 2/2006 | von Trepka et al. |
| 7,402,000 | B2 | | 7/2008 | Bastesen et al. |
| 7,600,569 | B2 | | 10/2009 | Routeau et al. |
| 8,052,351 | B2 | | 11/2011 | Bird |
| 8,882,389 | B2 | * | 11/2014 | Bastesen ................ F16L 1/20 405/169 |
| 2009/0162146 | A1 | | 6/2009 | Bastard et al. |
| 2020/0109797 | A1 | * | 4/2020 | Conti ...................... F16L 1/16 |

FOREIGN PATENT DOCUMENTS

| | | |
|---|---|---|
| FR | 2 859 495 | 3/2005 |
| GB | 2 304 394 | 3/1997 |
| GB | 2 356 233 | 5/2001 |
| WO | WO 2004/106696 | 12/2004 |
| WO | WO-2018215981 A2 * 11/2018 ............. B63B 35/03 |

* cited by examiner

SUBSEA CONNECTION OF PIPELINE SECTIONS

BACKGROUND OF THE INVENTION

(1) Field of the Invention

This invention relates to the connection underwater of pipeline sections, for example pipe stalks, to assemble a subsea pipeline. The resulting pipeline comprises such sections joined end-to-end in fluid communication with each other.

(2) Description of Related Art

Rigid subsea pipelines are commonly formed of lengths of steel pipe, known in the art as pipe joints, that are welded together end-to-ends Pipe joints are typically about 12 m (about 40 ft) in length but may be manufactured in multiples of that length, such as double, triple or quadruple pipe joints.

Pipe joints may be welded together offshore aboard an installation vessel, in particular when fabricating and laying a pipeline by S-lay or J-lay methods. In the S-lay method, a pipeline is fabricated by welding together pipe joints along a substantially horizontal firing line. The pipeline is launched from the vessel over a stinger, from which the pipeline curves down through the water column to the seabed. Conversely, in the J-lay method, pipe joints are lifted into an upright tower for welding to the end of a pipeline. The pipeline hangs substantially vertically from the vessel and extends downwardly through the water column to the seabed.

In recent years, the subsea oil and gas industry has faced the challenges of exploiting hydrocarbon resources in ever deeper water. Such depths require large, state-of-the-art installation vessels to handle the weight of the pipe string that must be suspended in the water column beneath the vessel.

Specialised vessels that are capable of laying pipelines in deep water are in constant demand to execute pipelaying projects around the world. Such vessels cost hundreds of millions of US dollars to acquire and have operational costs of hundreds of thousands of US dollars per day. Consequently, installation costs can be very high when such valuable assets are used to execute pipelaying projects far offshore.

In another approach to pipeline fabrication, multiple pipe joints may be welded together at an onshore or inshore location, such as a spoolbase, to form elongate pipeline sections such as pipe stalks or pipeline bundles. Such stalks or bundles may be of considerable length, for example a few kilometres, constrained largely by the space that is available to fabricate and to store them.

Once manufactured at an onshore or inshore fabrication site, pipe stalks or pipeline bundles must be transported to an offshore site for installation. For example, pipe stalks may be welded together end-to-end to form a pipeline that is spooled onto a reel-lay vessel. However, such a vessel is also expensive and specialised. Moreover, pipeline bundles, and some pipe stalks, cannot be spooled onto a reel.

In view of these constraints, it is known to tow pipeline sections such as pipe stalks from an onshore or inshore fabrication site to an offshore installation site. For example, the pipeline sections may be towed near the surface or at a mid-water depth using techniques such as the controlled depth towing method (CDTM) described in U.S. Pat. No. 4,363,566. On reaching the installation site, the pipeline sections are lowered to the seabed.

As the required length of a pipeline may exceed the maximum length of pipeline sections that can be fabricated and towed, successive pipeline sections may be towed, lowered and then connected to each other end-to-end underwater.

Various tools have been proposed to facilitate the interconnection of pipeline sections underwater. For example, U.S. Pat. No. 6,997,645 discloses a coupling tool that comprises a porch mounted on an end of one pipeline section and a reaction clamp mounted on an end of another pipeline section. The porch and the reaction clamp are connected by a hydraulic cylinder that is activated to couple together the mutually-facing ends of the pipeline sections. However, the ends of the pipeline sections have to be landed on the seabed at positions very close to each other for this tool to work.

U.S. Pat. No. 6,234,717 teaches the combined use of an axial force tool mounted on an end of one pipeline section and a reaction tool mounted on an end of another pipeline section. A remotely-operated vehicle (ROV) is coupled to the axial force tool and a winch is used to pull both tools together, hence coupling the pipeline ends. U.S. Pat. No. 6,227,765 discloses a similar pull-in arrangement.

A drawback of the tools disclosed in U.S. Pat. Nos. 6,234,717 and 6,227,765 is that they require accurate positioning of the pipeline ends relative to each other during installation. They therefore work better with pipeline sections of flexible pipe than with pipeline sections of rigid pipe, which is substantially heavier and stiffer than flexible pipe and so is less forgiving of inaccurate positioning. In this respect, those skilled in the art will understand that whilst rigid pipes have some flexibility, they are distinguished from flexible pipes as that latter term is understood in the art.

In U.S. Pat. No. 4,028,903, multiple lifting frames are used to lift the ends of pipeline sections. Saddles and jacks displace the pipelines. A beam extending in the axial direction guides the lifting systems. However, installing frames like these underwater is challenging and takes a long time, if indeed it is realistically practical in the great water depths that are increasingly being encountered in the subsea oil and gas industry.

GB 2304394 discloses a repair frame that allows lifting and clamping of two points of a pipeline around a location to be cut and repaired. However, there is no provision to displace the ends of the pipeline sections axially to connect them.

EP 1956184 teaches the use of a lifting and winching frame to handle the end of a first pipeline section and to pull, guide and connect the end of a pipe connector piece. However, this does not teach connecting two pipelines directly.

EP 2722571 describes a pipeline termination skid that is mounted to an end of a pipeline. The termination skid is designed to be mounted to a pipeline end section to provide support to a pipeline hub when the pipeline hub is connected to a corresponding spool piece. WO 2004/106696 discloses a spool piece termination structure for clamping together a spool and a pipeline.

US 2009/162146 discloses a system for installing subsea equipment, such as a pipeline, at a subsea location with restricted overhead access. GB 2356233 relates to a device for connecting two pipeline sections on the seabed.

BRIEF SUMMARY OF THE INVENTION

It is against this background that the present invention has been devised. In one sense, the invention provides a method of assembling a pipeline at a seabed location. The method comprises: landing a connection tool on the seabed over a free end portion of a first pipeline section already placed on the seabed; locking the connection tool to the free end portion of the first pipeline section; connecting a lower end of a second pipeline section to the connection tool via an initiation line; while applying tension to the initiation line against reaction force of the connection tool, landing at least a lower end portion of the second pipeline section on the seabed with the lower end facing a free end of the first pipeline section; and pulling the lower end of the second pipeline section into mechanical engagement with the free end of the first pipeline section.

The connection tool may be locked to the free end portion of the first pipeline before connecting the initiation line to the connection tool.

The connection tool is preferably fixed to the seabed, for example by embedding a foundation of the connection tool in the seabed. This may involve pumping water from within a suction pile foundation of the connection tool.

An upper end portion of second pipeline section may advantageously be suspended above the seabed while pulling the lower end of the second pipeline section into engagement with the free end of the first pipeline section. That suspended upper end portion may be a major portion of the second pipeline section. After engaging the lower end of the second pipeline section with the free end of the first pipeline section, the upper end portion of the second pipeline section may then be landed on the seabed.

The lower end of the second pipeline section may be pulled by tension in at least one wire that extends from the connection tool toward the second pipeline section. The lower end of the second pipeline section may also, or alternatively, be pulled by interengaging at least one pair of complementary coupling parts and then advancing one of those coupling parts relative to the other.

Where provided, the or each wire may pull one coupling part into engagement with the other coupling part. Where one coupling part is a male formation and the other coupling part is a female formation, the or each wire may extend through the female formation to the male formation before the female formation receives the male formation.

One of the coupling parts may be attached to the lower end portion of the second pipeline section before engaging the lower end of the second pipeline section with the free end of the first pipeline section. That coupling part may, for example, be attached to the lower end portion of the second pipeline section after landing that lower end portion on the seabed.

The free end portion of the first pipeline section may be lifted from the seabed before engaging the lower end of the second pipeline section with the free end of the first pipeline section.

The inventive concept also embraces a connection tool for assembling a pipeline at a seabed location. The tool comprises: a frame defining a downwardly-opening longitudinal passageway; a foundation such as one or more suction piles arranged to fix the frame to the seabed; a clamp and a porch supported by the frame, the clamp and the porch being arranged to lock a first pipeline section extending along the passageway, in use, against movement relative to the frame; an attachment point for an initiation line of a second pipeline section to be landed on the seabed in use; and a pull-in system arranged to pull the second pipeline section into end-to-end engagement with the first pipeline section locked by the clamp and the porch.

The attachment point may be substantially aligned with the clamp and the porch in an upright central longitudinal plane.

The tool of the invention may also be expressed in combination with a second pipeline section having an initiation line, when anchoring the initiation line of the second pipeline section via the attachment point.

The clamp is preferably mounted to the frame for vertical movement relative to the frame. Similarly, the porch may be mounted to the frame for vertical movement relative to the frame.

The pull-in system may comprise at least one winch wire extending from a winch mounted on the frame. The pull-in system may also, or alternatively, comprise at least one female coupling formation extending through the porch and at least one pull-in mechanism mounted on the porch in alignment with the female coupling formation. The or each winch wire may extend through a respective female coupling formation of the porch.

The tool of the invention may be used in combination with a reaction clamp that is arranged to be fixed to the second pipeline section in use. The reaction clamp may have at least one male coupling formation that is complementary to the female coupling formation of the porch and that is engageable with the pull-in mechanism mounted on the porch. At least one male coupling formation of the reaction clamp may have a longitudinally-toothed profile for ratchet engagement with the pull-in mechanism.

By virtue of the invention, a unique frame is used both for performing the connection or tie-in operation and for initiating laying of the second pipeline section. The first pipeline section is laid underwater and the frame is installed underwater. Then, the frame is used as a fixed anchor point for connecting a first end of the second pipeline section and for providing a reaction force against which to pull and at least partially install the second pipeline section. Then both pipeline section ends are pulled together, for example by a winch system, and connected, for example by a jack or ratchet system.

Embodiments of the invention provide a device or apparatus for direct connection of two pipeline sections. The apparatus comprises a frame to be installed around an end of a first pipeline section on the seabed. The frame comprises: foundations for anchoring the device to the seabed; a lifting clamp to be clamped to the first pipeline section and to lift the first pipeline section off the seabed; a removable porch to be clamped to the end of the first pipeline and to lift the first pipeline section; a fixed point such as a hook, a shackle or a padeye for connecting a wire for initiating laying of a second pipeline section; and a winch and wire for pulling an end of the second pipeline section close to the end of the first pipeline section.

The apparatus of these embodiments further comprises a removable reaction clamp to be clamped at the end of the second pipeline section. The reaction clamp can be coupled with the porch for coupling together the ends of the first and the second pipeline sections. The winch and wire are suitably connected, or connectable, to the reaction clamp.

One of the porch and the reaction clamp may comprise holes or other female engagement formations and jacks. The other of the porch and the reaction clamp may comprise ratchet posts or other male engagement formations that can engage the holes and the jacks. The jacks can then pull the reaction clamp toward the porch or vice versa. For example, the reaction clamp may comprise stabs that can engage the porch so that the assembly can pull the first end of the second pipeline into contact with the end of the first pipeline.

The foundations may, for example, be suction piles. In any event, the foundations are advantageously temporary to allow the apparatus to be moved or displaced.

Embodiments of the invention also implement a method for tie-in of first and second pipeline sections underwater. The method comprises the following steps: installing a connection tool at the location of the end of the first pipeline section; lifting the end of the first pipeline section using the connection tool; initiating a first end of the second pipeline section at be connection tool and laying the second pipeline section at least partially on the seabed; remotely installing a reaction clamp close to the first end of the second pipeline section; and using the connection tool to pull the reaction clamp closer to the end of the first pipeline section and then to couple the end of the first pipeline section and the first end of the second pipeline section.

A porch may be connected to the end of the first pipeline section. The connection tool, the reaction clamp and the porch may be removed after use.

Thus, the invention provides a subsea connection tool and system tool can be used to join pipe stalks subsea using mechanical connectors to assemble a pipeline subsea. Advantageously, the tool may be tethered to a low-cost, non-specialised construction vessel which will assist in deployment and operation of the tool. The invention enables subsea connection of multiple pipeline stalks and eliminates the requirement for expensive specialised pipelaying vessels.

In embodiments to be described, pipeline stalks fabricated onshore or inshore are transported to an offshore installation site. There, they are lowered to the seabed where they are connected to pre-installed pipeline sections using the subsea connection tool of the invention.

The subsea connection tool of the invention comprises a pipe lifting clamp and a lifting porch that lift and hold a substantially static first pipeline stalk off the seabed. The tool further comprises an initiation pull-head that provides a reaction point to lay a second pipeline stalk away from the tool, with a portion of that pipeline stalk held suspended in the water column. The tool is also equipped with a subsea winch and an associated sheave assembly that can pull-in the stalks close to each other. The tool is further equipped with a hydraulically-operated stroking tool to mate the stalks and to assist with the final tie-in.

Preferred embodiments implement the following steps for connecting pipeline sections subsea using the tool of the invention. Firstly, the tool is landed around a first pipeline section already laid on the seabed. The first pipeline section is then lifted using the lifting clamp and the end of the pipeline section is secured in the porch. Next, or optionally before lifting and securing the first pipeline section, the tool is used to initiate the second pipeline section, which may be a pipeline stalk that initially hangs as a catenary. The second pipeline section is laid away from the tool to touch down on the seabed and is partially laid on the seabed while most of its length is kept suspended dynamically in the catenary.

After a clamp has been installed around the end portion of the second pipeline section that lies on the seabed, for example using an ROV, the subsea winch of the tool is connected to stabs on the clamp. The winch can now commence pulling the pipeline sections closer before a hydraulic tool is activated to effect final tie-in of the pipeline sections. Once the pipeline sections have been mated, mechanical connection using standard pin-and-box type connectors may be completed, for example with ROV intervention as before.

Finally, the dynamic second pipeline section is laid on the seabed and the conjoined pipeline sections are lowered to the seabed. The first pipeline section is then released from the porch and the lifting clamp, whereupon a crane or winch of a surface vessel may be used to lift the tool from the seabed. The tool may then be recovered to a surface vessel to be moved to the next location requiring subsea connection, or the tool may be moved to that next location while still underwater. For example, in deep water, the tool may benefit from on-board propulsion or be propelled by a coupled ROV to move underwater while a vessel that suspends the tool relocates correspondingly at the surface.

Where suction piles serve as foundations of the tool, subsea intervention may be performed, for example by a ROV, to place and to remove the piles. In particular, an ROV may assist with pumping seawater from the piles to secure the tool after landing the tool on the seabed or with pumping seawater into the piles for removing the tool from the seabed.

BRIEF DESCRIPTION OF THE SEVERAL VIEWS OF THE DRAWINGS

In order that the invention may be more readily understood, reference will now be made, by way of example, to the accompanying drawings in which:

FIG. 8 is a perspective view the reaction clamp now engaged with a stroking mechanism of the lifting porch in readiness for final tie-in.

DETAILED DESCRIPTION OF THE INVENTION

Figure 1:
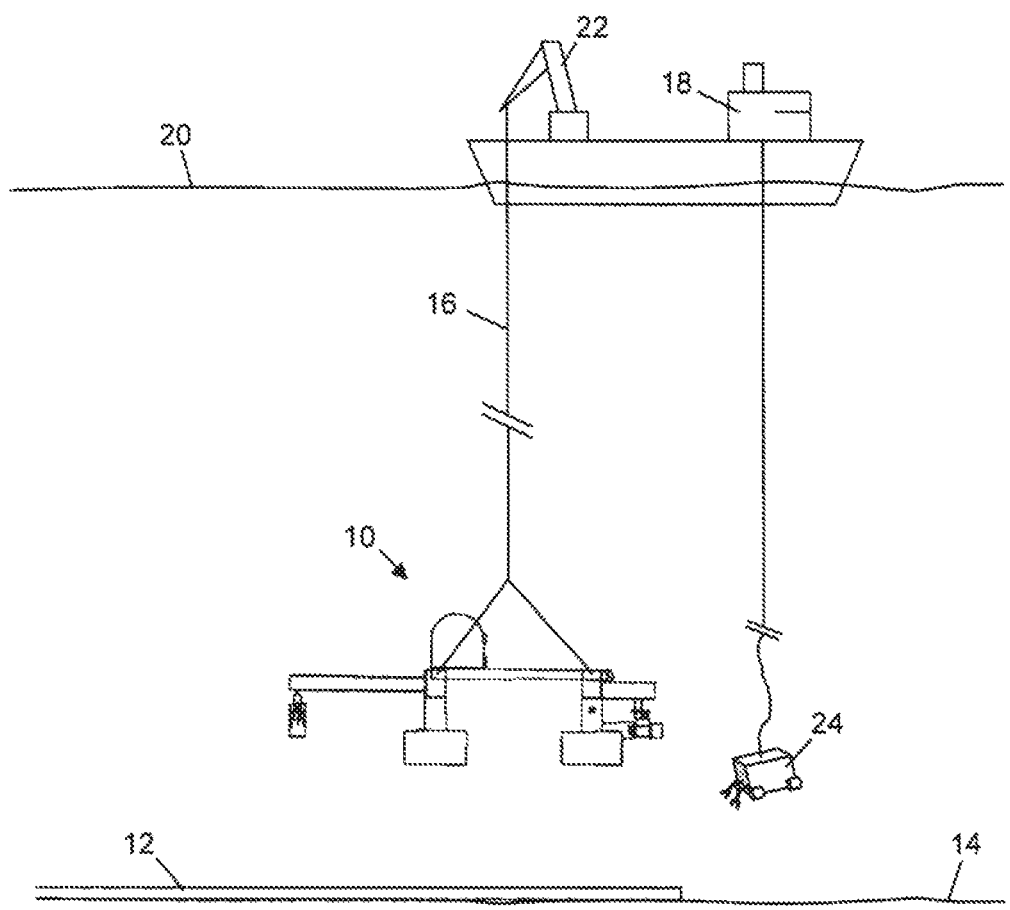
FIG. 1 is a side view of a connection tool of the invention suspended from a surface vessel at an installation site.

FIG. 1 of the drawings shows a connection tool 10 of the invention being moved toward a free end of a first pipeline section 12 that was previously laid or abandoned on the seabed 14. The connection tool 10 is shown suspended on a wire 16 from a vessel 18 at the surface 20 above the installation site, and is about to be landed on the seabed 14 over a free end portion of the first pipeline section 12. The free end portion terminates in the free end of the first pipeline section 12.

Advantageously, the vessel 18 need not be a specialised pipelaying vessel and so can be a relatively inexpensive and common offshore construction vessel. In this example, the wire 16 hangs from a crane 22 of the vessel 18 but the wire 16 could instead hang from a winch of the vessel 18.

The connection tool 10 may be transported to the installation site either suspended on the wire 16 underwater or lifted onto a working deck of the vessel 18, to be lowered into the water when required.

FIG. 1 also shows a work-class ROV 24 tethered to the vessel 18. The ROV 24 monitors the position, orientation and alignment of the connection tool 10 relative to the first pipeline section 12. The ROV 24 will also detach the wire 16 from the connection tool 10 once the connection tool 10 has been landed on the seabed 14. The ROV 24 may also couple itself to the connection tool 10 to apply propulsive or guiding thrust to the connection tool 10 when suspended in the water column.

As will be explained later with reference to FIG. 6, the same ROV 24, or a different ROV, is also involved with connecting a second pipeline section 26 to the first pipeline section 12.

Figure 2:
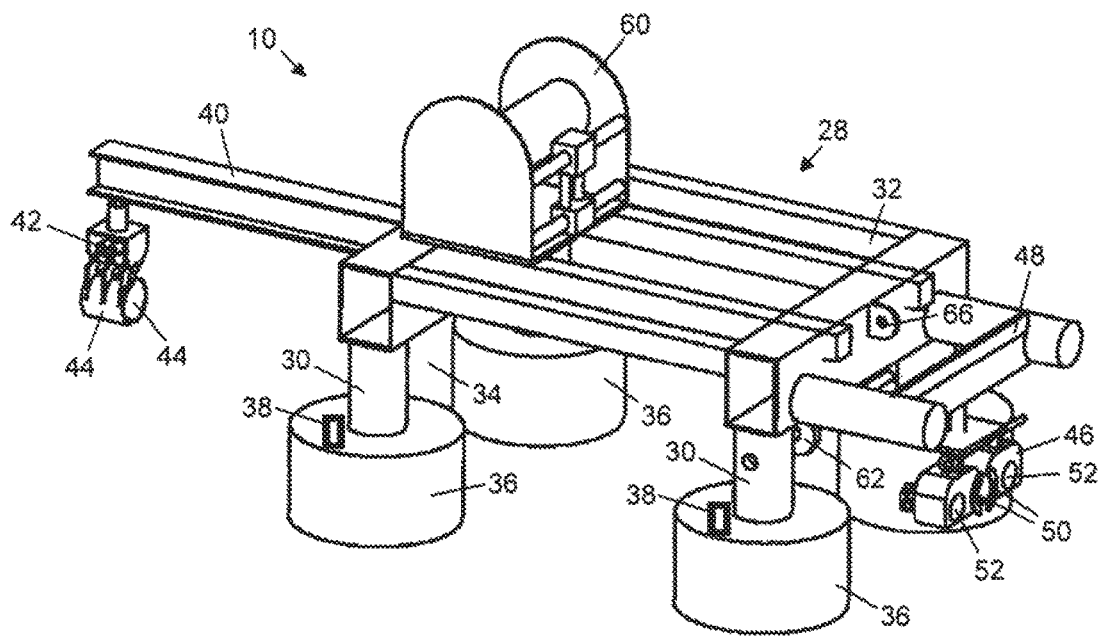
FIG. 2 is a perspective view of be connection tool shown in FIG. 1.
Figure 3:
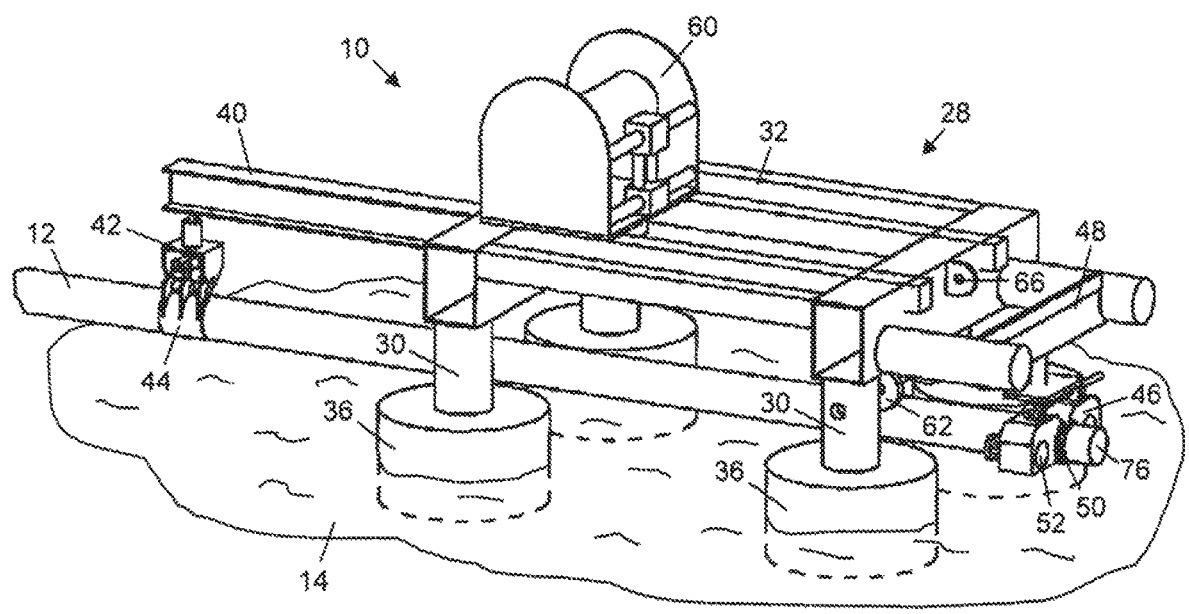
FIG. 3 is a perspective view of the connection tool, landed on the seabed around an end portion of a previously-laid first pipe stalk and lifting that end portion off the seabed.

FIG. 2 shows the connection tool 10 in isolation. FIG. 3 shows the connection tool 10 landed on, and partially embedded in, the seabed 14 astride the first pipeline section 12.

The connection tool 10 is generally symmetrical about an upright, substantially vertical central longitudinal plane. The tool 10 comprises a frame 28 that is arched in cross-section, defined by laterally-spaced pairs of legs 30 in a rectangular array and an upper bridge structure 32 that connects and extends between the pairs of legs 30.

The upper bridge structure 32 spans a downwardly-opening, longitudinally-extending, open-ended passageway 34 between the legs 30. This passageway 34 allows the tool 10 to be landed on the seabed 14 with the legs 30 straddling the first pipeline section 12 between them. Then, the first pipeline section 12 extends centrally along the passageway 34 between the legs 30 as shown in FIG. 3.

A foundation attached to the frame 28 comprises four suction piles 36 in a rectangular array, one on each leg 30. Each suction pile 36 has a port 38 for pumping seawater into or out from the hollow interior of the pile 36. For example, the ports 38 may be arranged for coupling to a pump supported by an ROV 24.

The suction piles 36 engage the soft seabed 14 when the connection tool 10 is ended and embed more deeply into the seabed 14 when water is pumped out through the ports 38. Conversely, when water is pumped in through the ports 38, the piles 36 rise relative to the seabed 14 and so are more easily lifted and disengaged from the seabed 14 when moving or removing the tool 10 after use.

A central longitudinally-extending beam 40 is cantilevered from one end of the bridge structure 32. The beam 40 supports a lifting clamp 42 that hangs from the beam 40. The lifting clamp 42 can be moved vertically relative to the beam 40 between lower and upper positions.

Jaws 44 of the lifting clamp 42 define a downwardly-facing opening to embrace and clamp around the first pipeline section 12 that extends along the passageway 34 as shown in FIG. 2. Once clamped in the jaws 44, the first pipeline section 12 can be lifted away from the seabed 14 by raising the lifting clamp 42 into the upper position.

A lifting porch 46 hangs centrally under an outrigger 48 at the end of the bridge structure 32 opposed to the beam 40, in alignment with the lifting clamp 42 in the central longitudinal plane. Jaws 50 of the porch 46 define a downwardly-facing opening to embrace and clamp around the first pipeline section 12 as shown in FIG. 3. This locks the connection tool 10 to the free end portion of the first pipeline section 12. For this purpose, the porch 46 can also be moved vertically relative to the outrigger 48 between lower and upper positions. Alternatively, the porch 46 could be fixed relative to the frame 28, in which case the lifting clamp 42 may lift the first pipeline section 12 into engagement with the porch 46.

The jaws 50 of the porch 46 are disposed between a pair of parallel bores or apertures 52 that extend longitudinally through the porch 46 from an outer face 54 to an inner face 56 of the porch 46. Each aperture 52 is aligned with a respective stroking mechanism 58 on the inner face 56 of the porch 46. Each stroking mechanism 58 may comprise a longitudinally-reciprocable hydraulic jack.

Figure 7:
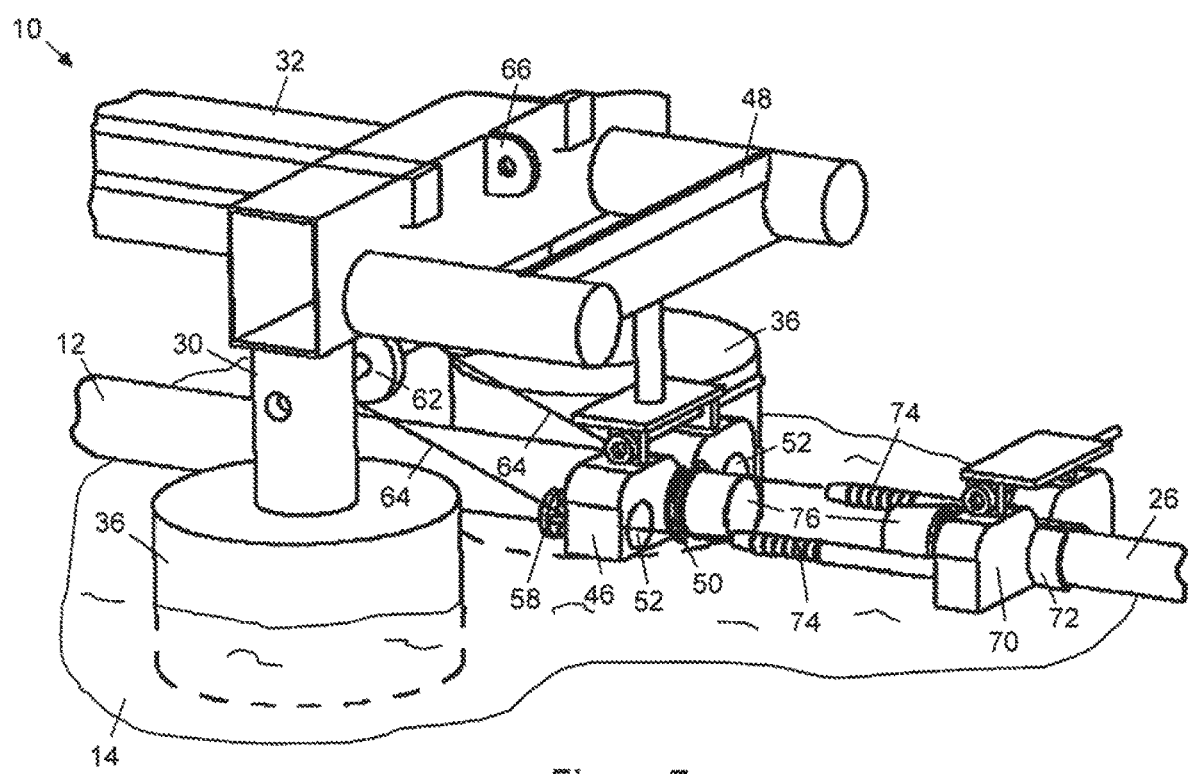
FIG. 7 is a perspective view of the connection tool pulling the reaction clamp attached to the second pipe stalk toward a lifting porch that supports the end portion of the first pipe stalk.
Figure 8:
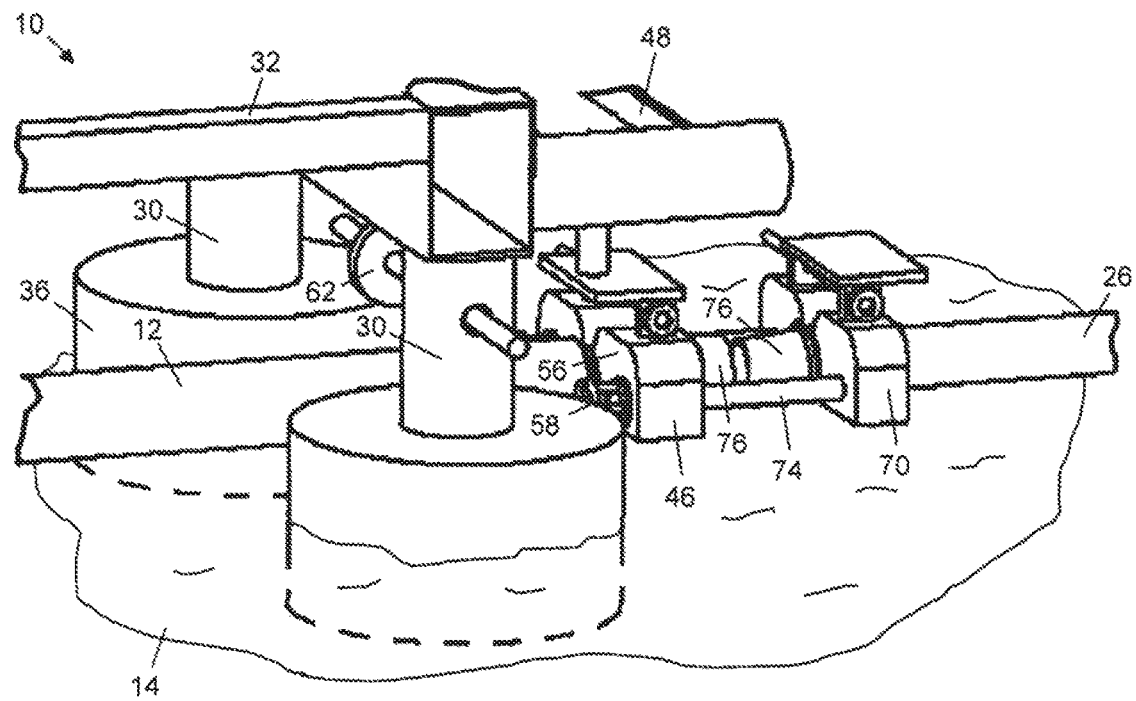

A winch system 60 is mounted on top of the bridge structure 32. Sheaves 62 are slung under the bridge structure 32 to guide winch wires 64 from the winch system 60, as seen in FIG. 7.

Figure 4:
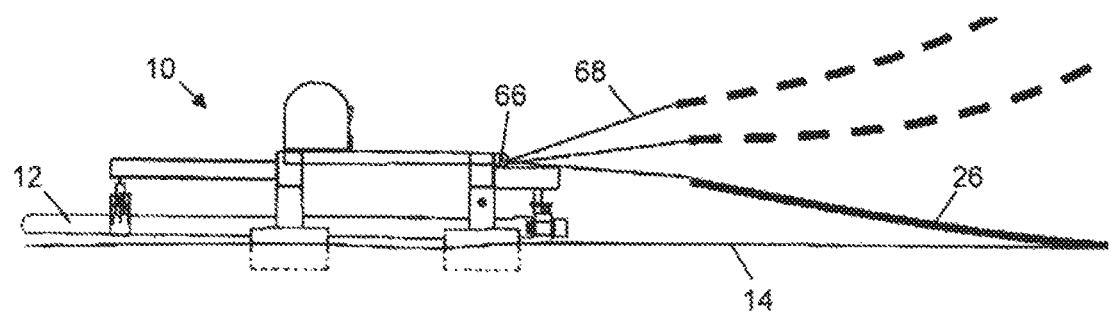
FIG. 4 is a side view of the connection tool being used as an anchor for initiating laying of a second pipe stalk to be connected to the first pipe stalk.

The bridge structure 32 also supports fixing formation 66 at its end above the porch 46. The fixing formation 66 provides an attachment point for an initiation wire 68 fixed to the lower end of the second pipeline section 26 as shown in FIG. 4. The ROV 24 shown in FIG. 1 can be used to make that connection.

Via the initiation wire 68, the second pipeline section 26 initially hangs as a catenary between the fixing formation 66 and an installation vessel (not shown) on the surface 20. Again, the installation vessel does not have to be a specialised pipelaying vessel as it needs only to tow, upend, lower and apply hold-back tension to the second pipeline section 26. In principle, the installation vessel could be the same vessel 18 as is used to transport and lower the connection tool 10 as shown in FIG. 1.

With the connection tool 10 anchored to the seabed 14 to provide a stable reaction point via the fixing formation 66, the second pipeline section 26 is lowered through the positions shown in dashed lines in FIG. 4 until its lower end portion touches down on the seabed 14 as shown in solid lines. The ROV 24 shown in FIG. 1 can monitor the position of the touch-down point if required.

It will be apparent that as the initiation wire 68 is attached to the connection tool 10 in substantially the same vertical plane as the porch 46 and the lifting clamp 42, this ensures correct positioning and orientation of the lower end of the second pipeline section 26 on the seabed 14 relative to the first pipeline section 12.

Figure 5:
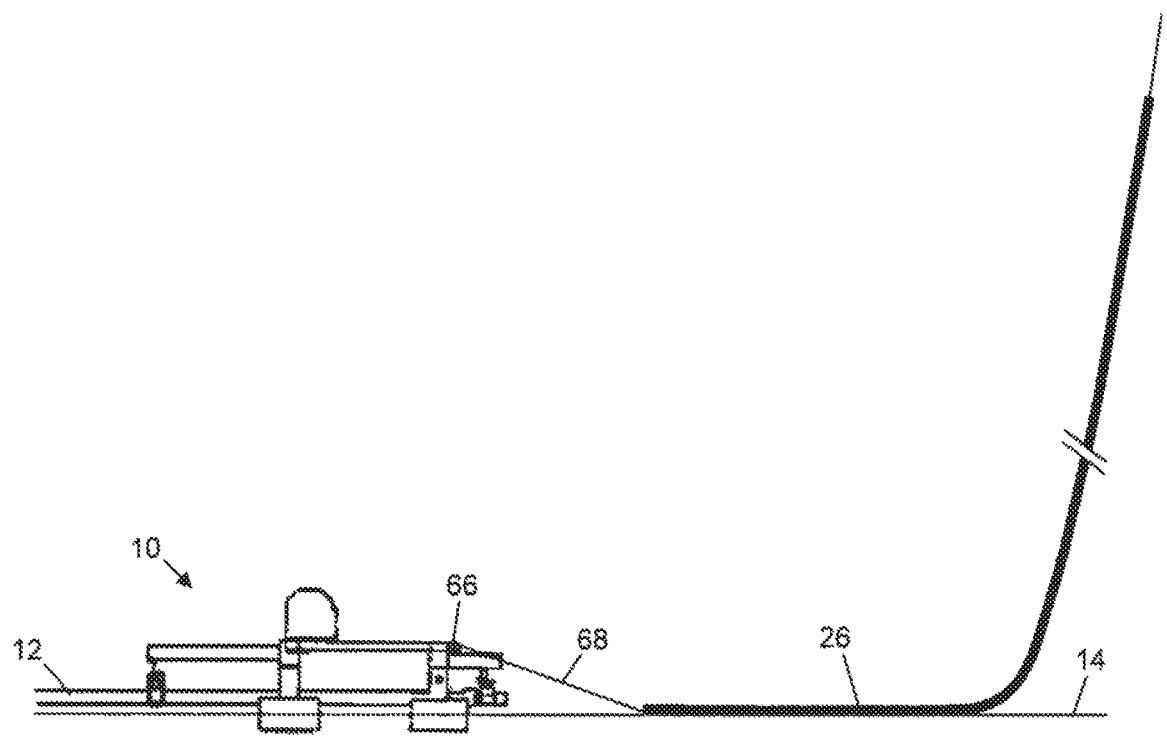
FIG. 5 is a side view of the second pipe stalk being laid on the seabed, substantially in alignment with the first pipe stalk held by the connection tool.

Lowering of the second pipeline section 26 onto the seabed 14 continues after the initial touchdown, as shown in FIG. 5. Lowering is paused when a minor lower end portion of the second pipeline section 26 lies on the seabed 14 and a major upper end portion remains suspended in the water column between the surface 20 and the seabed 14.

Suspending the upper end portion in this way reduces the apparent weight of the second pipeline section 26 on the seabed 14. This makes it easier to pull the lower end of the second pipeline section 26 into engagement with the first pipeline section 12. Yet, the static lower end portion landed on the seabed 14 stabilises the lower end of the second pipeline section 26 against unwanted movement across the seabed 14, which could otherwise be driven by the effect of sea dynamics on the suspended upper end portion.

Figure 6:
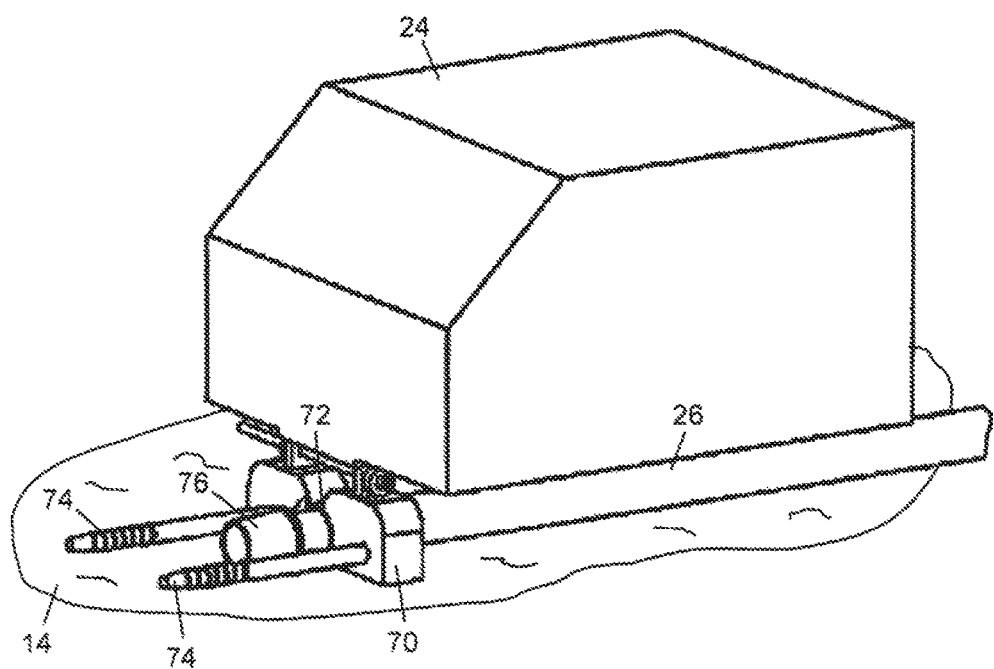
FIG. 6 is a perspective view of an ROV installing a reaction clamp around the second pipe stalk, close to the end of the second pipe stalk that faces the first pipe stalk.

Turning next to FIG. 6 of the drawings, this shows an ROV 24 attaching a reaction clamp 70 to the end portion of the second pipeline section 26 that lies on the seabed 14. The ROV 24 has detached the initiation wire 68 from the end of the second pipeline section 26.

Features of the lifting porch 46 have counterparts in corresponding features of the reaction clamp 70. Specifically, jaws 72 of the reaction clamp 70 define a downwardly-facing opening to be lowered onto and to embrace and clamp around the second pipeline section 28. Also, the jaws 72 of the reaction clamp 70 are disposed between a pair of parallel prongs or stabs 74 that extend longitudinally toward the end of the second pipeline section 26. The stabs 74 are spaced and dimensioned to align with and to fit into the apertures 52 in the porch 46 of the connecting tool 10. The stabs 74 also have a ridged or sawtooth profile to engage as a ratchet with the stroking mechanism 58 on the inner face 56 of the porch 46.

FIG. 7 shows the operation of a pull-in system in which the winch wires 64 extend from the sheaves 62 of the connecting tool 10 through the apertures 52 in the porch 46. The ROV 24 couples each winch wire 64 to a free end of a respective one of the stabs 74. The winch system 60 of the connecting tool 10 is then activated to pull the stabs 74, and hence the second pipeline section 28 attached to the reaction clamp 70, toward the porch 46 and so toward the end of the first pipeline section 12. Tension in the winch wires 64 also corrects any minor misalignment between the second pipeline section 26 and the first pipeline section 12.

Figure 9:
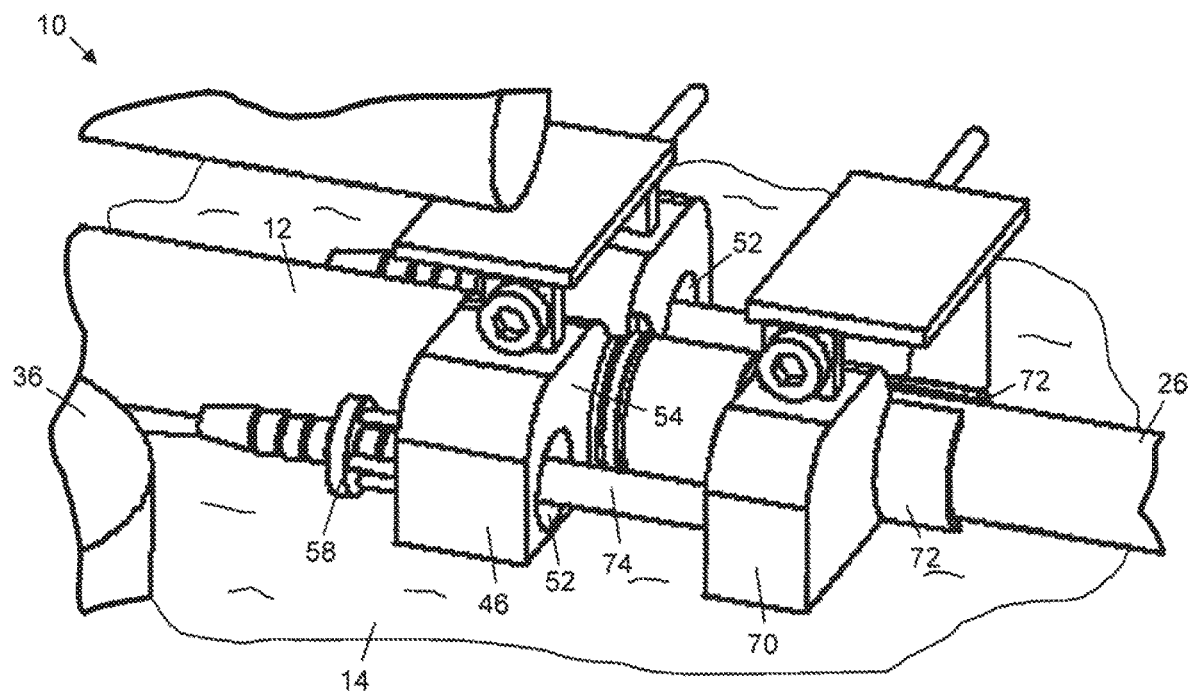
FIG. 9 is an enlarged perspective view of the reaction clamp pulled by the stroking mechanism toward the lifting porch to effect final tie-in and interconnection of the first and second pipe stalks.

Eventually the stabs 74 enter the apertures 52 and extend through to the inner face 56 of the porch 46, where they are engaged by the stroking mechanism 58 as shown in FIG. 9. Reciprocal operation of the jacks of the stroking mechanism 58 then pulls the stabs 74 further into the apertures 52. This completes mechanical coupling between the first and second pipeline sections 12, 26 as the reaction clamp 70 attached to the second pipeline section 26 is pulled toward the porch 46 that supports the first pipeline section 12. For this purpose, the ends of the first and second pipeline sections 12, 26 are equipped with complementary fittings 76, such as pin and box fittings, to effect end-to-end mechanical coupling by relative axial movement.

The remainder of the second pipeline section 28 can then be laid on the seabed 14, hence elongating the first pipeline section 12 by the length of the second pipeline section 26. Third and subsequent pipeline sections can then added to the free end of the second pipeline section 26 by repeating the process as many times as is necessary to lengthen the emergent pipeline.

After the first and second pipeline sections 12, 26 have been coupled together, their interface is lowered back to the seabed 14 by lowering the lifting clamp 42 and the lifting porch 46 relative to the frame 28 of the connecting tool 10. The connecting tool 10 and the reaction clamp 70 can then be detached from the first and second pipeline sections 12, 26 and, in a reversal of the installation process, lifted from the seabed 14 for reuse.

Many variations are possible within the inventive concept. For example, the connection tool could have an on-board propulsion system and could, in principle, support itself with variable buoyancy like a submarine. Thus, the connection tool could itself be an underwater vehicle.

The first and second pipeline sections need not both be discrete pipe stalks or indeed of the same construction or dimensions, or laid by the same technique. For example, the first pipeline section could be a pipeline bundle and the second pipeline section could be a reel-lay pipe.

The invention claimed is:

1. A method of assembling a pipeline at a seabed location, the method comprising:

landing a connection tool on the seabed over a free end portion of a first pipeline section already placed on the seabed;

locking the connection tool to the free end portion of the first pipeline section;

connecting a lower end of a second pipeline section to the connection tool via an initiation line after landing the connection tool on the seabed, and before the second pipeline section is landed on the seabed;

while applying tension to the initiation line against reaction force of the connection tool, landing at least a lower end portion of the second pipeline section on the seabed with the lower end facing a free end of the first pipeline section; and pulling the lower end of the second pipeline section into mechanical engagement with the free end of the first pipeline section.

2. The method of claim 1, comprising locking the connection tool to the free end portion of the first pipeline section before connecting the initiation line to the connection tool.

3. The method of claim 1, comprising fixing the connection tool to the seabed.

4. The method of claim 3, comprising embedding a foundation of the connection tool in the seabed.

5. The method of claim 4, comprising pumping water from within the foundation of the connection tool, the foundation being a suction pile foundation of the connection tool.

6. The method of claim 1, comprising suspending an upper end portion of the second pipeline section above the seabed while pulling the lower end of the second pipeline section into engagement with the free end of the first pipeline section.

7. The method of claim 6, wherein the suspended upper end portion is a major portion of the second pipeline section.

8. The method of claim 6, comprising landing the upper end portion of the second pipeline section on the seabed after engaging the lower end of the second pipeline section with the free end of the first pipeline section.

9. The method of claim 1, comprising pulling the lower end of the second pipeline section by tension in at least one wire that extends from the connection tool toward the second pipeline section.

10. The method of claim 1, comprising pulling the lower end of the second pipeline section by interengaging at least one pair of complementary coupling parts and then advancing one of those coupling parts relative to the other of those coupling parts.

11. The method of claim 10, comprising pulling the lower end of the second pipeline section by tension in at least one wire that extends from the connection tool toward the second pipeline section, wherein the at least one wire pulls one of the coupling parts into engagement with the other of the coupling parts.

12. The method of claim 11, wherein one of the coupling parts is a male formation and the other of the coupling parts is a female formation, and the at least one wire extends through the female formation to the male formation before the female formation receives the male formation.

13. The method of claim 10, comprising attaching one of the coupling parts to the lower end portion of the second pipeline section before engaging the lower end of the second pipeline section with the free end of the first pipeline section.

14. The method of claim 13, comprising attaching said coupling part to the lower end portion of the second pipeline section after landing that lower end portion on the seabed.

15. The method of claim 1, comprising lifting the free end portion of the first pipeline section from the seabed before engaging the lower end of the second pipeline section with the free end of the first pipeline section.

16. A connection tool for assembling a pipeline at a seabed location, the tool comprising:
a frame defining a downwardly opening longitudinal passageway;
a foundation arranged to fix the frame to the seabed;
a clamp and a porch supported by the frame, the clamp and the porch being arranged to lock a first pipeline section extending along the passageway, in use, against movement relative to the frame;
a fixed attachment point configured to anchor an initiation line of a second pipeline section to be landed on the seabed in use, wherein the attachment point is substantially aligned with the clamp and the porch in an upright central longitudinal plane; and
a pull-in system arranged to pull the second pipeline section into end-to-end engagement with the first pipeline section locked by the clamp and the porch;
wherein the tool is in combination with the second pipeline section, and the initiation line of the second pipeline section is anchored via the attachment point.

17. The tool of claim 16, wherein the clamp is mounted to the frame for vertical movement relative to the frame.

18. The tool of claim 16, wherein the porch is mounted to the frame for vertical movement relative to the frame.

19. The tool of claim 16, wherein the foundation comprises at least one suction pile.

20. The tool of claim 16, wherein the pull-in system comprises at least one winch wire extending from a winch mounted on the frame.

21. The tool of claim 16, wherein the pull-in system comprises at least one female coupling formation extending through the porch and at least one pull in mechanism mounted on the porch in alignment with the female coupling formation.

22. The tool of claim 21, wherein the pull-in system comprises at least one winch wire extending from a winch mounted on the frame, and wherein the or each winch wire extends through a respective female coupling formation of the porch.

23. The tool of claim 21, in combination with a reaction clamp arranged to be fixed to the second pipeline section in use, wherein the reaction clamp has at least one male coupling formation that is complementary to the female coupling formation of the porch and that is engageable with the pull-in mechanism mounted on the porch.

24. The tool of claim 23, wherein the at least one male coupling formation of the reaction clamp has a longitudinally-toothed profile for ratchet engagement with the pull-in mechanism.

* * * * *